(12) United States Patent
Pfister et al.

(10) Patent No.: US 10,677,687 B2
(45) Date of Patent: Jun. 9, 2020

(54) METHOD AND TEST OBJECT FOR CARRYING OUT A TEST RUN WITH A TEST OBJECT

(71) Applicant: AVL LIST GmbH, Graz (AT)

(72) Inventors: Felix Pfister, Graz (AT); Stefan Geneder, Geisenfeld (DE); Stefan Jakubek, Vienna (AT)

(73) Assignee: AVL LIST GmbH, Graz (AT)

( * ) Notice: Subject to any disclaimer, the term of this patent is extended or adjusted under 35 U.S.C. 154(b) by 188 days.

(21) Appl. No.: 16/073,157

(22) PCT Filed: Jan. 27, 2017

(86) PCT No.: PCT/EP2017/051735
§ 371 (c)(1),
(2) Date: Jul. 26, 2018

(87) PCT Pub. No.: WO2017/129728
PCT Pub. Date: Aug. 3, 2017

(65) Prior Publication Data
US 2019/0041295 A1 Feb. 7, 2019

(30) Foreign Application Priority Data
Jan. 28, 2016 (AT) .............................. A 50046/2016

(51) Int. Cl.
*G01M 17/007* (2006.01)
*G09B 9/042* (2006.01)
(Continued)

(52) U.S. Cl.
CPC ........ *G01M 17/0074* (2013.01); *G01M 13/02* (2013.01); *G01M 15/04* (2013.01);
(Continued)

(58) Field of Classification Search
CPC ............. G01M 17/0074; G01M 13/02; G01M 17/0072; G01M 15/04; G01M 15/048; G09B 9/042
See application file for complete search history.

(56) References Cited

U.S. PATENT DOCUMENTS 6,754,603 B2 * 6/2004 Turbett ............... G01M 13/025
702/113
8,549,903 B2 10/2013 Rzehorska et al.
(Continued)

FOREIGN PATENT DOCUMENTS

DE 102013213863 B3 7/2014
EP 2354778 A1 8/2011
(Continued)

OTHER PUBLICATIONS

Austria Search Report Application No. A500462016 Completed: Jan. 28, 2016 1 page.
(Continued)

*Primary Examiner* — Freddie Kirkland, III
(74) *Attorney, Agent, or Firm* — Whitmyer IP Group LLC

(57) ABSTRACT

To subject a test object during a test run on a test bench to real environmental and/or surrounding conditions, particularly thermal conditions, it is provided that at least one temperature is measured at a measurement point as a measured variable during the test run on the test bench. At least one test object component of the test object is subdivided in a number of segments. The thermal interaction of at least one segment with the environment of the vehicle is simulated during the test run by a thermal simulation model of the simulation model. The thermal simulation model calculates the segment heat flow that is supplied to or dissipated from the at least one segment. This segment heat flow is adjusted as a function of the measured temperature at the test bench
(Continued)

on at least one segment by means of a number of heat flow actuators.

8 Claims, 4 Drawing Sheets

(51) Int. Cl.
  G01M 13/02 (2019.01)
  G01M 15/04 (2006.01)
(52) U.S. Cl.
  CPC ......... G01M 17/0072 (2013.01); G09B 9/042 (2013.01); G01M 15/048 (2013.01)

(56) References Cited

U.S. PATENT DOCUMENTS

| | | | |
|---|---|---|---|
| 9,435,249 B2* | 9/2016 | Ruby | F01P 11/14 |
| 9,454,857 B2 | 9/2016 | Pfister | |
| 10,161,513 B2* | 12/2018 | Jammulamadaka | F16H 59/72 |
| 2003/0167143 A1 | 9/2003 | Turbett et al. | |
| 2007/0260373 A1* | 11/2007 | Langer | G01M 17/007 |
| | | | 701/31.4 |
| 2007/0260438 A1 | 11/2007 | Langer et al. | |
| 2008/0275682 A1 | 11/2008 | Langer | |
| 2011/0191079 A1 | 8/2011 | Rzehorska et al. | |

FOREIGN PATENT DOCUMENTS

| | | |
|---|---|---|
| EP | 2947448 A1 | 11/2015 |
| WO | 2013174974 A1 | 11/2013 |

OTHER PUBLICATIONS

International Preliminary Report on Patentability Application No. PCT/EP2017/051735 Completed: May 11, 2018 14 pages.
International Search Report and Written Opinion of the International Searching Authority Application No. PCT/EP2017/051735 Completed: Mar. 15, 2017; dated Mar. 23, 2017 13 pages.
Krämer S., et al., "Shift Roll Testing on the Engine Test Bench," (Abstract only) MTZ-Engine Magazine, 2015, 76(3), pp. 36-41. Retrieved from https://www.springerprofessional.de/verlagerung-von-rollentests-auf-den-motorenpruefst.

* cited by examiner

METHOD AND TEST OBJECT FOR CARRYING OUT A TEST RUN WITH A TEST OBJECT

TECHNICAL FIELD

The present teaching relates to a method and a test bench for carrying out a test run on a test bench, wherein a test object in the form of a vehicle or a component of a vehicle is set up and operated in reality on the test bench, and a simulation unit with a simulation model simulates said test run.

BACKGROUND

A test, a trial or an experiment is an activity used to determine whether one (or several) technical component(s) (a mechanical setup, hardware or software), which is (are), speaking in general terms, the test object, is (are) functional in the context of particular framework conditions, and/or whether particular characteristics are present. Accordingly, the test object is the technical system that must be tested. Said test object can be the overall system (for example, a vehicle) or a part of the overall system (for example, a combustion engine, a drive system, an exhaust gas system or an exhaust aftertreatment system of a motor vehicle).

Some tests are used to examine actual, often transient, processes to which the test piece is subjected. They are often conducted in reproduced environments, i.e., simulated environments. Dedicated test benches are often used for these activities, such as, for example, an engine test bench, a drivetrain test bench or a roller test bench. These test benches enable to systematically subject the test object to specified environmental conditions, which means the test object is tested under said environmental conditions, and the reproducibility of a test process is thereby enabled. But test benches are also used for other purposes, such as for validating new or unknown processes in environments that could not be reproduced in reality for the test object, or only by means of very time-consuming and expensive processes. As the test environment is always an incomplete representation of the actual environment, any results obtained from testing must always be analyzed under consideration of the quality of the test environment, i.e. of the test bench and the simulated environment.

For example, the stated object of a test bench is often simulating real or fictitious (i.e., virtual) test runs of motor vehicles. In the following, these runs will be referred to as virtual test runs. For example, a combustion engine on an engine test bench or a drivetrain on a drivetrain test bench is subject to interface variables that are variable over time via a suitable interface (interface between a test bench that is available in reality and the simulation) and that would be experienced by the test object as a component of the overall system vehicle/driver/environment during a real test drive, e.g. of a real vehicle driving on the Großglockner High Alpine Road. Similarly, it can be interesting to subject the test object on the test bench to interface variables that are variable over time and may occur in course of an arbitrary, also a fictitious and not necessarily representable in reality, route. Such virtual test runs can be generated by means of different processes. For example, they can be measured during real test runs, or they are in part predefined and/or standardized (for example, standardized consumption cycles). However, such runs can also be calculated with sufficiently good quality in real time or approximately in real time (i.e., online) by means of virtual environments (a so-called X-in-the-loop test run, wherein "X" denotes the test object, for example, a combustion engine, drivetrain, etc.). Different measurements can be taken at the test bench during the execution of the virtual test run. To this end, the test object that is to be examined (combustion engine, drivetrain, battery, vehicle, etc., or components thereof) is loaded at the interfaces usually by a load unit (actuator), such as, for example, a dynamometer (mechanical actuator) or a battery tester (electrical actuator), whereby the test object is subject to the mechanical or electrical load that results from the virtual test run. Such test runs on the test bench enable the execution, in particular, of development or testing work on the test object that is situated on the test bench without the requirement of having to set up the overall system (e.g., a physical complete vehicle) in which the test object is normally incorporated as a part of the overall system, and without the necessity of first having to complete the test that is to be performed by means of a real test run with the real vehicle. Such tests on the test bench, moreover, have the advantage of good reproducibility and thereby better comparability of the results.

However, due to system limitations, a test bench is not capable of reproducing the conditions of a real test run with absolute exactness, but only with some limitation. Still, it is not always desired, nor required that the test object be subjected in all cases to these exact conditions. In some cases, the test object may be merely subjected to conceived, hypothetical conditions. According to the prior art, for example, current work on test benches focuses substantially, for example, on a high level of consistency of the mechanical and electrical power flows between the virtual and real test runs. Despite good correspondence of the particular measured variables over time that are taken on the test bench, often there are considerable differences with regard to some other measured variables over time. For example, it was found that, despite the good quality regarding the consistency of the mechanical power flows (such as, for example, speed and torque) and despite the use of identical measuring techniques for taking emission measurements during the virtual test run on the drivetrain test bench and on the roller test bench, when comparing the results to the real test run with the physical vehicle, the emission measurements (CO, NOx, . . . ), particularly in the partial load range, do not yield the same results. The reason is often to be found in different thermal and thermodynamic conditions, i.e., in the different temperature and heat flux density fields on neuralgic vehicle components. Said differences are due, among other reasons, to the different media flows (for example, air, water, oil, etc.) the test object is subjected to.

A real vehicle contains components and/or structural parts that can be exposed to different thermal loads. A related example is the combustion engine with a turbocharger and an exhaust gas system.

Components, such as a catalytic converter or particle filter, can also be arranged in the exhaust gas system. A thermal energy flow over the surfaces of the mentioned components and part components occurs in both cases (real or virtual test run). The electrical energy storage of a hybrid vehicle is another example. This component also interacts thermally with its environment/surroundings and is itself impacted by influences from the environment/surroundings ("conditions"). Correspondingly, an engine block or an exhaust gas system of a vehicle will engage in thermal exchanges with its environment in different ways, depending on the conditions and/or surrounding conditions. As a result, there are, accordingly, different transient component-temperature fields and heat flux densities (thermal energy flows)

inside the component and on the component's surface. For example, in winter-like environmental conditions, a combustion engine will radiate a greater quantity of heat (cold road conditions, cold ambient air) than in summer-like environmental conditions (hot road conditions, hot ambient air). The heat transfer (heat flux densities) between a test object and the environment occurs based on the physical mechanisms of heat conduction, heat flux (convection) and heat radiation.

During a real test run with a real vehicle along a real route, heat transfer processes are in effect on the surfaces of the test object and/or part of the test object. Varying environmental and/or surrounding conditions are in effect that are characterized, for example, by the air pressure, humidity or temperature, resulting in effects such as spray water on the test object, etc. However, different environmental conditions are in effect at the test bench, which is one reason why the results from a virtual test run on the test bench deviate from a real test run. The generation (simulation and/or emulation) of within given conditions arbitrary heat transfer processes at the test bench has been of little interest thus far and/or has raised insufficient attention to date.

The cooling-air blowers, for example, that are often used on the test bench for generating an air flow over the test object, as well as test bench conditioning (for example, temperature adjustments in the test bench space) are typically insufficient to precisely emulate the real environmental conditions on the test bench. Cooling-air blowers are mostly used for reproducing the effects of engine cooling relative to the headwind speed. This is why said cooling-air blowers are often inadequately dimensioned, and/or they do not provide the required degrees of freedom. For example, frequently, the speed of the cooling-air blower is only controlled as a function of the traveling speed. By providing air conditioning in the test bench space, it is possible to regulate the air temperature and humidity in the environment of the test bench.

Further known is the use of conditioning equipment for the media at the test bench, such as intake air, coolant, oil and charge air. Said equipment is used, for the most part, on component test benches (engine, drivetrain, battery test benches, etc.). By means of such equipment the respective temperatures of the media is influenced and/or controls. The conditioning equipment for the intake air can, furthermore, influence the humidity and pressure of air.

A cooling-air blower and testing room air conditioning, as well as media conditioning receive setpoint settings, such as, for example, for temperature, humidity and pressure, from the test bench automation system. The setpoint are set one in form of a respective variable over time (e.g., temperature) and there is no interaction (in the sense of an X-in-the-loop simulation) in form of a retroactive effect on a virtual environment of the test object, wherein this can also be an anticipated, future environment. Moreover, there is the problem of finding the setpoint, i.e., the problem of setting a setpoint that reflects the virtual environmental conditions of the test object in a way that is close to reality.

Also known in the art are test bench apparatuses that have test object parts (such as, for example, an engine on an engine test bench) thermally encapsulated in order to better be able to emulate the thermal conditions. An apparatus of this kind can be derived, for example, from Krämer S., et al., "Shift Roll Testing On The Engine Test Bench," MTZ-Engine Magazine, 2015, 76 (3), pp. 36-41. The auto body is simulated therein on the engine test bench in that the engine is arranged inside an enclosed engine encapsulation and the exhaust gas system inside an enclosed underbody encapsulation in order to simulate the thermal conditions inside the engine compartment and/or the underbody. An enclosure is provided, respectively, in an isolated housing (engine encapsulation, underbody encapsulation) that are fitted with blowers. The temperature in the engine and the underbody encapsulations is controlled by the blower. Accordingly, the solution as introduced herein allows for comparisons of the results from the measurements of the emissions on the engine test bench and the results from the roller test bench. However, this is insufficient for a realistic reproduction of the environmental conditions, because, on the one hand, a global temperature is adjusted in the engine and the underbody encapsulations and, on the other hand, the problem concerning correct setpoint settings persists. Consequently, various components of the test object, such as, for example, the engine block, turbocharger, cooler, exhaust gas system, etc. and/or parts thereof, have temperature distributions on their surfaces that are not consistent with the real or desired temperature distributions. Still, the temperatures of these components have a determinative influence not only on the heat transfer processes in form of heat energy fluxes ("heat flows"), but they also influence, for example, the emission behavior of the engine (for example, NOx, CO, etc.), whereby the undesired discrepancies between real and virtual test runs result. This means that the described method does not solve the problem of reproducing and/or of anticipating the thermal behavior of the test object during a real test run.

Therefore, patent DE 10 2013 213 863 B3 already describes a cooling system for a component, such as a combustion engine, that enables adjusting the temperatures on the component in that the component is ventilated by a blower matrix that is made up of a plurality of individual blowers. The cooling system therein enables adjusting different temperature zones (temperature fields) on a component. A target temperature for individual points is preset as a setpoint value, which is known from the very outset (meaning as early as the beginning of the test run), in form of a time curve that is adjusted by a controller unit via the blower matrix to examine, for example, the thermal strength of the component or of parts thereof. In contrast to conventional test bench apparatuses, this is an improvement, particularly with regard to the thermal conditions for a test bench experiment, and which may often be sufficient. However, the component temperature as a target variable for controlling conditions on the test bench disregards thermal transfer processes in form of thermal energy fluxes of the real test object in the different test environments. Accordingly, effects such as convection, heat radiation, etc. that play an important role at the components of the test object (physical vehicle) are therefore omitted from consideration on the test bench. Providing the temperature field of the surface of the test object and/or of the test object per se, as described in DE 10 2013 213 863 B3, neglects the thermal transfer processes and is therefore often insufficient for realistic test bench experiments in form of virtual test runs on the test bench.

Correspondingly, patent DE 10 2013 213 863 B3 is based on the very limiting assumption that the target temperatures on the selected measurement points are known as a function over time (i.e., they can be preset in advance as command variables of the control). Said values must be defined in advance, wherein such arbitrary determinations, however, do not allow generation of realistic environmental conditions, or said values would have to be established in advance over the course of an expensive and complex real test run.

The patent DE 10 2013 213 863 B3 does not address the problem concerning the determination of setpoints.

SUMMARY

Therefore, it is one object of the present teaching to provide a method for executing a test run, for example, in form of a thermal X-in-the-loop test run, and an associated test bench, with a test object that is situated on the test bench that will enable to subject the test object during the test run to realistic environmental and/or surrounding conditions and/or to conditions that result based on the laws of the thermal heat transfer of a virtual environment.

This object is achieved according to the present teaching by the method as specified in the introduction and in the same manner by the test bench as mentioned in the introduction, in that at least one temperature is measured as a measured variable at a measurement point on the test bench during the test run, and wherein at least one test object component of the test object is subdivided into a number of segments, while the thermal interaction of at least one segment with the environment of the vehicle is simulated during the test run by a thermal simulation model of the simulation model, wherein the thermal simulation model calculates the segment heat flow that is supplied to or dissipated from the at least one segment, and wherein this segment heat flow is adjusted as a function of the measured temperature at the test bench on the at least one segment by a number of heat flow actuators that subject the test object to a heat flow.

Due to the present teaching, it is therefore possible to subject the test object to certain thermal environmental conditions and to thereby create conditions on the test bench that approximate reality. These thermal environmental conditions interact with the test object in form of thermal transfer processes, and they can approximate reality (i.e., they may, in fact, occur in the later reality of the test object as part of a vehicle that is in use in reality—example: vehicle traveling through Death Valley), or they can be fictitious (i.e., conceived but still corresponding to real, physical conditions—example: vehicle traveling through Death Valley at an outside temperature of 60° C.). Aside from the thermal load, the test object is frequently additionally stressed on the test bench with mechanical and electrical loads, and/or via mass and information flows (e.g., CAN communication).

Based on the thermal simulation model, it is possible to reproduce the thermal interaction of the test object and/or segments of the test object that is to be conditioned with the simulated environment in any desired way that is within particular technical boundaries. It is possible therein to simulate thermal transfer processes of the test object that are variable over space and time and that correspond to real conditions. Using the heat flow actuators, it is possible to adjust these thermal transfer processes on the test bench on the test object, whereby the test object on the test bench is essentially subject to the same or sufficiently similar thermal conditions as a partial component of an overall system (for example, a vehicle) during a test run under real conditions or fictitious conditions, that are, however, still physically consistent with reality (example: traveling from the thermal conditions of Death Valley to the thermal conditions at the South Pole within two hours).

Preferably, the quality of the simulation can be improved further if the simulation model includes, in addition, one or a plurality of the following models: vehicle model, driver model, road or route model, wheel model, environmental model. Moreover, additional partial models are suited for increasing the flexibility, whereby it is possible to consider the most varied influences during the test runs.

Advantageously, at least one additional measured variable is detected and processed in the simulation model. It is similarly advantageous if at least one additional further measured variable of the test object environment of the test object is detected and processed in the simulation model.

BRIEF DESCRIPTION OF THE DRAWINGS

The present teaching that is the subject-matter of the present specification will be described in further detail below in reference to FIGS. 1 to 6, which are exemplary in nature, schematic and not limited to the described advantageous embodiments according to the present teaching. Shown are as follows.

DETAILED DESCRIPTION

Figure 1:
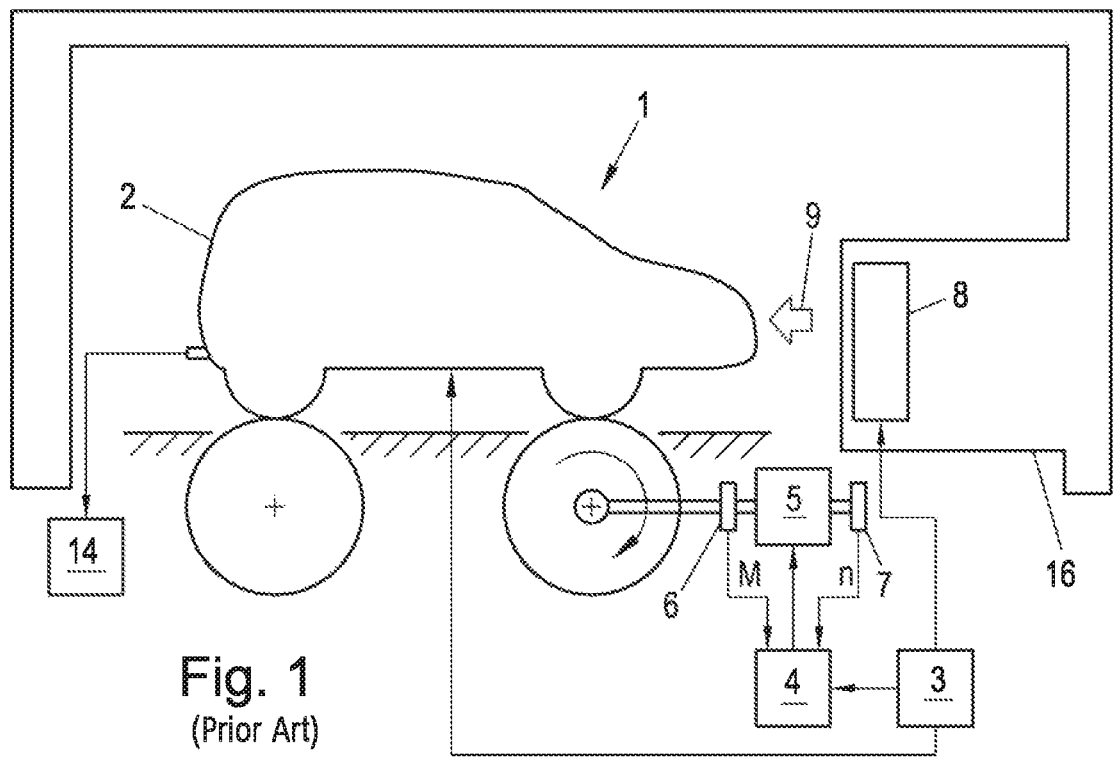
FIG. 1 shows a roller test bench for a vehicle according to the prior art.

FIG. 1 depicts a conventional test bench 1 for a test object 2. In the shown embodiment, the test object 2 is a motor vehicle, and the test bench 1 is a roller test bench. It is understood that the test object 2 can also be any partial system of the motor vehicle, such as, for example, a drivetrain, a combustion engine, a drive battery (power pack), a turbocharger, a catalytic converter, etc., and the test bench 1 can be any matching test bench, such as, for example, a drivetrain test bench, an engine test bench, a power pack test bench, a turbocharger test bench, a catalytic converter test bench, etc.

A test bench automation is provided on the test bench 1 that takes the form of a test bench automation unit 3, which controls the virtual test run that is to be executed on the test bench (=test run) and actuates, accordingly, all the devices of the test bench 1 that are necessary to this end (i.e., particularly the actuators) according to the requirements of the test run. The test bench automation unit 3 can, particularly, also actuate the test object 2. If the test object 2 is a motor vehicle, for example, known driver robots can be arranged inside the vehicle that implement the control commands by the test bench automation unit 3, such as gear changes, acceleration, etc. Alternatively, or additionally, the test bench automation unit 3 could actuate the test object 2 directly, for example, via a test object control unit, such as, for example, a vehicle control unit (ECU), a transmission control unit (TCU), a hybrid control unit, a battery management system, etc. In the case that a combustion engine is the test object 2, the test bench automation unit 3 could actuate, for example, the throttle valve position α (see FIG. 3) or the fuel injection.

A load is applied to the test object 2 by means of a load machine (generally, an actuator) 5, in the present case mechanically (mechanical power flow between the test object and the environment). In the case of a roller test bench, the (mechanical) load machine 5 is the input and/or output of the test bench rollers, as indicated in FIG. 1. In the case that a combustion engine or a drivetrain as the test object 2, the mechanical load machine 5 would be, for example, a dynamometer or an electrical dynamometer that is connected to the combustion engine or the drivetrain. In the case that a battery is the test object 2, the load machine 5 would be electrical, for example, in form of an electrical battery tester. Suitable load machines for different test objects 2 are well known in the art, which is why any further discussion of them is presently not necessary.

The load machine 5 is most often controlled by an actuator controller 4, which in turn receives setpoints from the test bench automation unit 3 for adjusting, for example, particular and often transient load moments M or particular and often transient speeds n of the test object 2. The test bench 1 typically provides also a torque measuring device 6 and/or a speed measuring device 7 that establish the corresponding actual values of the load moment M and the speed n of the test object 2, and that make these values available to the test bench automation unit 3. It is understood that other or additional measured variables can be used for other test objects 2 and/or test bench types, such as, for example, an electrical current or electrical voltage, which are measured and supplied to the test bench automation unit 3.

Furthermore, the emissions are measured during the test run on the test bench 1, for example, by means of an exhaust gas measurement system 14. Naturally, it is understood that, depending on the test object 2, other or additional measurements can be taken, particularly measurements that are necessary in the development of the test object, such as, for example, measurements as to consumption, electrical energy flow, etc. The fundamental goal of a test run lies in detecting and analyzing at least one output variable of the test object 2, which are, for example, emission, consumption, power, etc., to derive based thereupon findings for the development of the test object 2. In these efforts, it is desirable for the test object 2 to essentially behave identically on the test bench 1 and when it is incorporated in the physical vehicle.

At least one conditioning unit 16 is often also provided on the test bench 1 intended for conditioning the test object environment of the test object 2 and/or of the test object 2. In particular, this way, it is possible to subject the test object 2 to a particular (e.g., desired) heat transfer that is variable in terms of space and time and that the test object 2 on the test bench 1 exchanges with the testing environment thereof. The heat transfer can be coupled to a specific material transfer, for example, heat transfer with an air flow or another material flow. Accordingly, the heat transfer also comprises such material transfers as equivalents to heat transfers. A test bench air conditioning means for adjusting the environmental temperature, humidity, etc. in the testing environment is often provided as a conditioning unit 16. The conditioning unit 16 can, furthermore, also comprise a blower 8 for simulating, for example, a headwind. But the blower 8 can also be provided separately from the conditioning unit 16 on the test bench 1, as a separate installation. A blower 8 of this kind contributes to subjecting the test object 2 to a particular (e.g., desired) heat transfer process that is variable in terms of space and time, and which the test object 2 exchanges with the testing environment. It is understood here too that, frequently, it is possible to use different conditioning units 16 for different types of test benches. In the shown embodiment, the conditioning unit 16 comprises a blower 8 that subjects the test object 2 to a particular air flow field 9.

In addition, in a manner that is known in the art, the conditioning unit 16 at the test bench 1 for conditioning the test object 2 can further comprise a media conditioning unit, for example, intake air conditioning, charge air conditioning, oil conditioning or coolant conditioning. The former are not shown in FIG. 1 to improve the clarity of the drawing. These actuators also contribute to subject the test object 2 to particular, often desired, heat transfer processes that are variable over space and time.

The conditioning unit 16, where applicable with the blower 8 and/or with a media conditioning unit, typically receives particular setpoints (temperature, humidity, mass flows, . . . ) from the test bench automation unit 3 that are adjusted by the conditioning unit 16 and/or the blower 8 or the media conditioning unit. As outlined in the introduction, such a conditioning unit 16 with a blower 8 and/or with classical media conditioning units cannot at all or in view of the testing task that is to be accomplished only inadequately simulate the desired (for example, approximating reality) heat transfer processes on test object 2 or on test object components.

To be able to implement the test runs on the test bench 1 in such a manner that the thermal conditions of the test object 2 are consistent during the test run with the preset or desired conditions, particularly also such conditions that simulate reality (in the sense of a "tracing run" of a real test run on the test bench), according to the present teaching, it is provided that the thermal conditions of the test object 2 be reproduced in accordance with these requirements. This will be explained below based on FIG. 2 and the example of a roller test bench as test bench 1 and a motor vehicle as test object 2 and based on FIG. 3 and the example of an engine test bench as test bench 1 and a combustion engine as test object 2. Some of the components of the test bench 1 from FIG. 1 have been omitted to improve the clarity of the drawings.

Test object 2 comprises a plurality of test object components $PK_i$, $i=1, \ldots, m$, wherein the test object component $PK_i$ can be an entire assembly of the test object 2, such as a combustion engine 10, an exhaust gas system 11 or exhaust gas aftertreatment units 12, 13, such as a catalytic converter or a particle filter inside the exhaust gas system 11. But the test object component $PK_i$ can also be a component of the test object 2 or a part of an assembly of test object 2, such as, for example, an exhaust pipe section of the exhaust gas system 11. However, it is also possible for the entire test object 2 to stand for a test object component $PK_i$ ($i=1$), for example, when the test object 2 is an electrical rechargeable battery. The present teaching provides for the presence of at least one such test object component $PK_i$. A test object component in the sense of the present teaching is particularly a part of the test object 2 that is subject to a thermal interaction (heat transfer, heat flux densities) that is variable over space and time and which the test object 2 exchanges with the test object environment thereof, as described below. Accordingly, especially such parts are suitable as test object components $PK_i$ whose behavior or characteristics are a function of the thermal load. This way, it is possible to influence particular characteristics of the test object 2. For example, the characteristic "NOx emissions" is, among others, a function of the thermal load of the test object component "catalytic converter".

At a number n of measurement points $MS_i$, $i=1, \ldots, n$, wherein, according to the present teaching, at least one measurement point $MS_1$ is necessary, a measurement unit $ME_i$, $i=1, \ldots, n$ is arranged, by which a measured variable $MG_i$, $i=1, \ldots, n$ of the test object 2 is measured. It is also possible to provide different measurement units MEi at one measurement point MSi for the purpose of measuring different measured variables MGi. At least one measured variable MGi therein is a temperature, or a measured variable based upon which it is possible to calculate or estimate a temperature. Accordingly, at least one measurement unit MEi is, for example, a simple temperature sensor that serves for measuring a temperature of the test object 2 at the measurement point MSi. A measurement unit MEi for detecting a temperature can, for example, detect a temperature of a medium, such as the temperature of an exhaust gas or a fluid, an assembly temperature and/or component temperature or a surface temperature. In principle, it is also possible to measure complex three-dimensional temperature fields of the test object 2, of a test object component PKi or of a part thereof, by means of a thermal image camera as a measurement unit MEi or by use of other methods.

Applying suitable mathematical/physical methods, it is possible to derive the entire temperature field (meaning as to the spatial temperature distribution) of the test object 2 or a test object component PKi or of parts thereof (for example, the surface of the test object component PKi) on the basis of some temperature measurements that were taken for the test object 2. A method of this type could utilize, for example, the known interpolation via spline functions or the method of finite elements in order to estimate temperatures and/or spatial temperature curves between the measurement points MSi.

Using measurement units MEi on the test object 2, it is also possible to measure a media flow, such as the flow of exhaust gas through the exhaust gas system 11 or an intake air flow. Other possible measurements that can be taken are media pressures, such as exhaust gas pressures, that can be established at various points.

Similarly, with a measurement unit MEi on the test bench 1, it is also, additionally, possible to measure a measured variable MGi of the test object environment of the test object 2, preferably in the immediate vicinity of the test object 2. A measured variable MGi of the test object environment can be, for example, the air pressure, an environmental temperature, a humidity, etc. Not all measurement points MSi, measurement units MEi and measured variables MGi have been designated in FIGS. 2 and 3 to improve the clarity of the drawings.

To be able to simulate heat transfer processes in the desired or prescribed manner on a test object component PKi on the test bench 1, at least one heat flow actuator $15_j$, j=1, . . . , k is provided. The desired heat transfer processes are generated on a test object component PKi by means of the at least one heat flow actuator $15_j$, particularly in form of heat flows $\dot{Q}(t)$, or heat flux densities $\dot{q}(t, x)$, that are preferably variable in terms of space (x) and time (t). For reasons of simplification, only $\dot{Q}$ and $\dot{q}$ will be used below. The heat flow $\dot{Q}$ is the integral of the heat flux density $\dot{q}$ and the two variables can be used in an equivalent manner. Only the term heat flow $\dot{Q}$ will therefore be used below, wherein this is also understood to include in an equivalent manner a heat flux density $\dot{q}$ or any other variable that is equivalent to a heat flow $\dot{Q}$.

A heat flow actuator $15_j$ can represent a heat sink, a heat source, or both. Various devices are conceivable as heat flow actuator $15_j$, which transfer heat (in any direction), or that have the capability of subjecting particularly the test object components PKi to heat flows $\dot{Q}$. Conceivable devices are, for example, water or air heat exchangers, fluid flow devices (for example, blowers, venturi flow devices), Peltier elements, spray nozzles for spraying fluids, such as water, etc.

Figure 2:
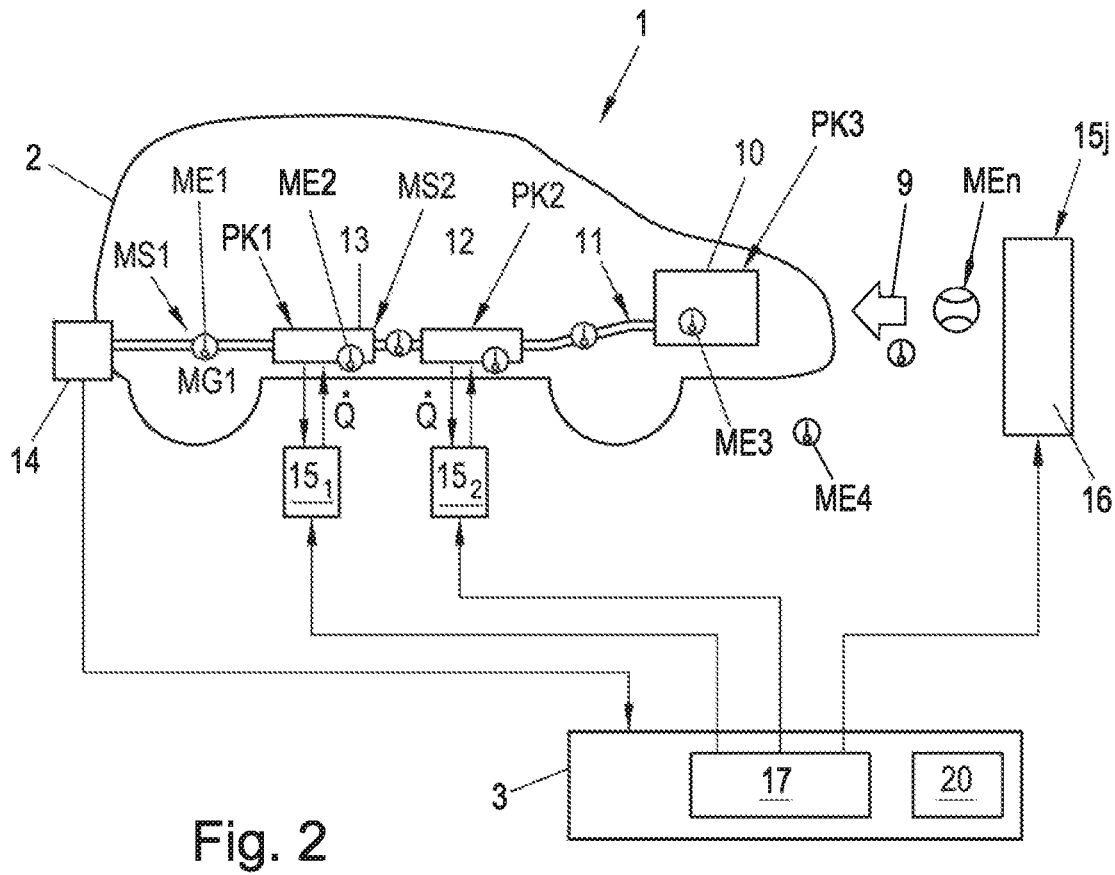
FIG. 2 shows a roller test bench according to the present teaching.
Figure 3:
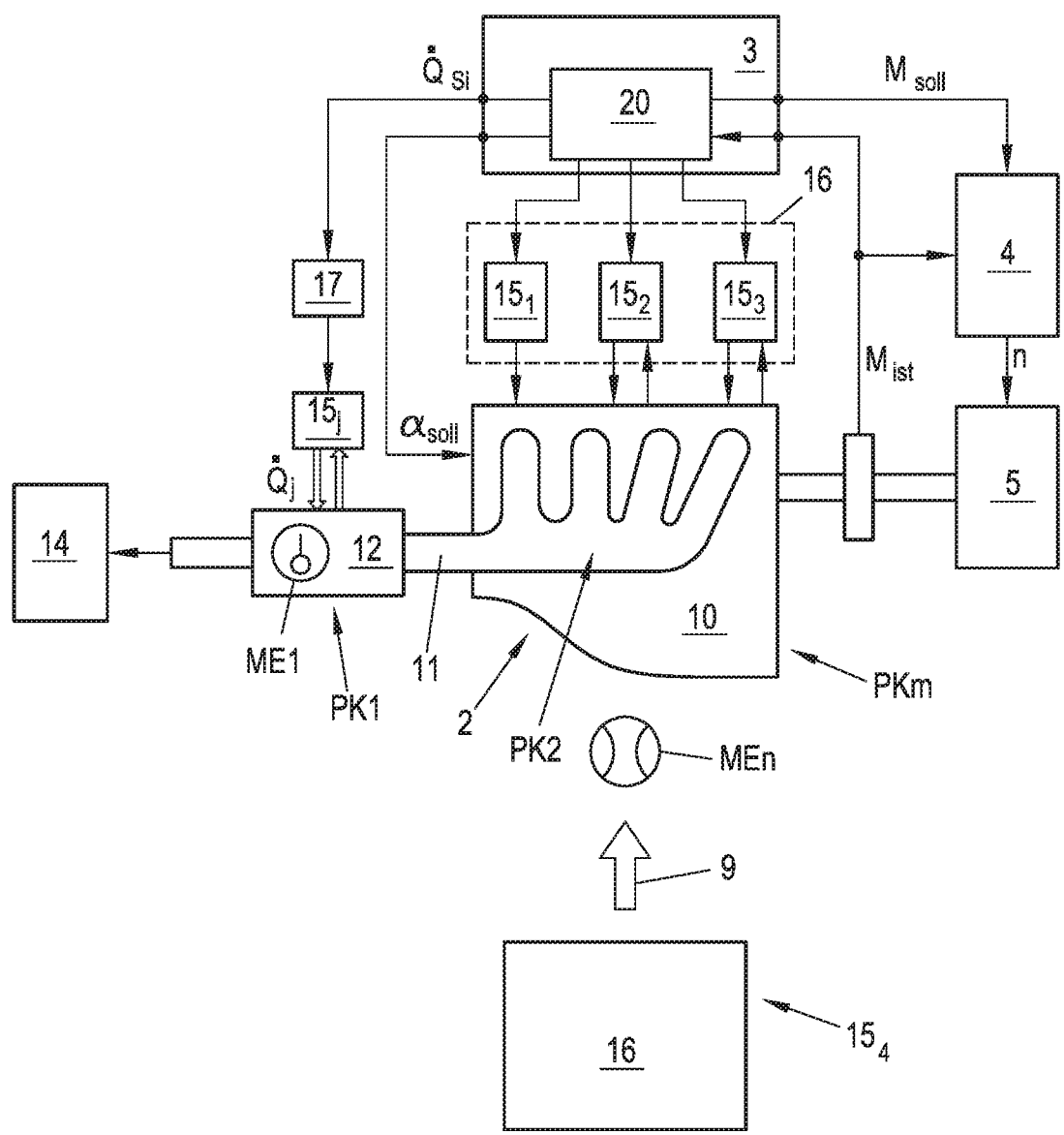
FIG. 3 shows an engine test bench according to the present teaching.

This means, therefore, that even a conventional conditioning unit 16 for the test bench conditioning is also usable, as a matter of principle, as a heat flow actuator $15_j$, as indicated in FIGS. 2 and 3. In the same way, it is also possible to use the blower 8 of the test bench 1 or a media conditioning unit of the conditioning unit 16, such as, for example, intake air conditioning, charge air conditioning, oil conditioning or coolant conditioning of a combustion engine 10, as a heat flow actuator $15_j$, as indicated in FIG. 3 with the heat flow actuators $15_1$, $15_2$ and $15_3$. A media conditioning unit of this kind is typically configured as a heat exchanger for the respective medium. This means, accordingly, that the test object 2 and/or a test object component PKi is subject to a specific, preferably preset, heat transfer that is variable over space and time, which the test object 2 exchanges with the test object environment, by means of a heat flow actuator $15_j$ and a heat flow $\dot{Q}$.

The precise configuration of the heat flow actors $15_j$ is secondary for purposes of the present teaching. The only requirement that is specified for the heat flow actuator $15_j$ is the capability of generating a heat flow $\dot{Q}$ to a test object component PKi of the test object 2 and/or a heat flow $\dot{Q}$ away from a test object component PKi of the test object 2, or both. This means that any heat flow actuator $15_j$ can supply heat to and/or dissipate heat from the test object 2.

Using the measurement units MEi, it is also possible to detect a measured variable of a heat flow actuator $15_j$, such as, for example, a blower speed or a flow speed of the air, when the heat flow actuator $15_j$ is a blower 8 (as seen in FIG. 2 with the measurement unit MEn), or a fluid flow of a heat exchanger fluid (air, water, etc.), when the heat flow actuator $15_j$ is a heat exchanger.

At least one heat flow controller 17 handles the actuation of the heat flow actuator $15_j$ for adjusting a desired heat flow $\dot{Q}$. The implementation of the heat flow controller 17 can be achieved as a separate unit on the test bench 1 (as seen in FIG. 3) and/or integrated in the heat flow actuator $15_j$, and/or as part of the test bench automation unit 3 (as seen in FIG. 2).

Accordingly, the control the heat flow actuators $15_j$ by means of the heat flow controller(s) 17 is a multi-variable control, which processes at least one measured variable MGi, particularly at least a temperature at the measurement point MSi on the test object 2, with the object of generating a specific heat flow $\dot{Q}$. If a measurement unit MEi for detecting an actual variable is also needed for controlling a heat flow actuator $15_j$, a corresponding measurement unit MEi must be provided. In the alternative, it is also possible to calculate the necessary actual variable based on other measured variables MGi. Any suitable control law can be implemented in the heat flow controller 17, wherein the concrete implementation of the control law is secondary for purposes of the present teaching.

The measurement units MEi supply their measured variables MGi to the heat flow controllers 17, which process the corresponding measured variable MGi, and, if need be, they supply said variables also to the test bench automation unit 3 or to the simulation unit 20.

The effect of the heat flow actuators $15_j$ on the individual test object components PKi that must be conditioned is usually coupled. This means that heat flow actuators $15_j$ act simultaneously on a plurality of test object components PKi, or vice versa, in that a test object component PKi is influenced by a plurality of heat flow actuators $15_j$ simultaneously. Therefore, it is advantageous to decoupling the individual heat flow actuators $15_j$ for the purpose of controlling the heat flow actuators $15_j$. Ample references are found in the literature that describe related known methods in the art (for example, J. K. Hedrick, A. Girard, "Control of Nonlinear Dynamic Systems: Theory and Applications," 2005; here: particularly Chapter 8 and S. Skogestad, I. Postlethwaite "Multivariable Feedback Control Analysis and Design, 2nd Edition, 2001; here: particularly Chapters 9, 10 and 3.4.1), which is why this aspect shall not be discussed in further detail.

Insofar as there is no coupling between different test object components PKi and respectively allocated heat flow actuators $15_j$, it is possible to achieve decentralized control with standalone heat flow controllers 17 even without decoupling.

Together, the heat flow actuators $15_j$ generate on the test object 2 a temporally and spatially variable heat flux field $\dot{Q}_f$, or analogously a heat flux density field $\dot{q}_f$, that acts upon the test object components PKi. When the heat flow actuators $15_j$ are decoupled, there results the heat flux field $\dot{Q}_f = [\dot{Q}_1, \ldots, \dot{Q}_j]$, or analogously a heat flux density field $\dot{q}_f = [\dot{q}_1, \ldots, \dot{q}_j]$, on a test object components PKi that is be conditioned.

Figure 4:
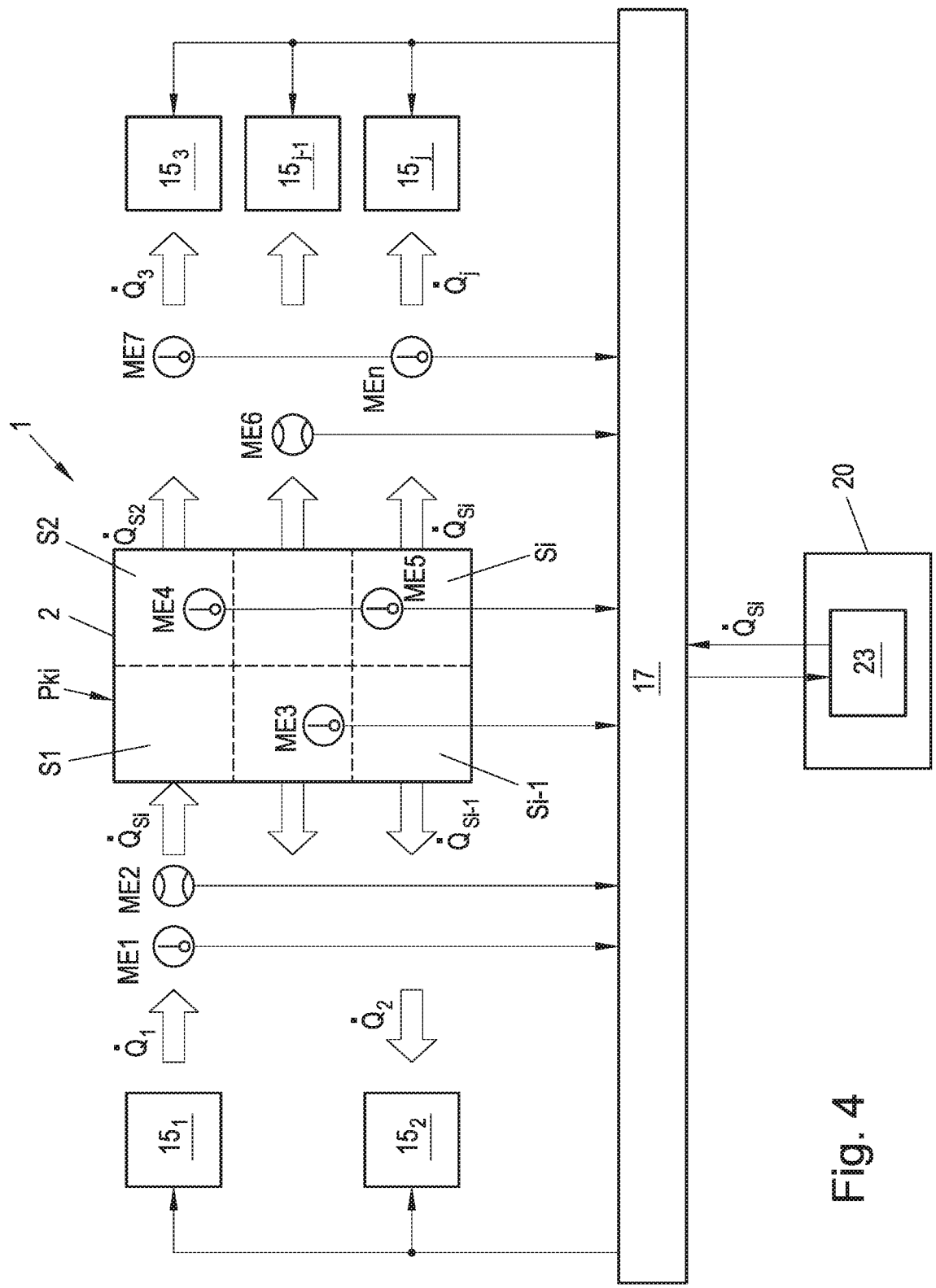
FIG. 4 shows the control of the heat flows on segments of a test object according to the present teaching.

A test object component PKi is advantageously subdivided in $i=1, \ldots, s$ finite segments Si. Said subdivision in segments Si can be implemented by means of a granularity that is adequate for the requirement or application. A segment Si can be a complete test object component PKi, for example, the exhaust gas system 11 or an exhaust gas aftertreatment unit 12, 13 of the exhaust gas system 11. Still, the segments Si can be subdivided in the same way into finer segments, for example, a test object component PKi can be subdivided in a plurality of segments Si. For example, the exhaust gas system 11 can be subdivided in ten segments Si. However, as a matter of principle, an entire test object 2, such as, for example, a battery, can also be a segment Si. The specific subdivision of the segments Si is secondary in the context of the present teaching. It is important to note, however, that the number of $i=1, \ldots, k$ of the heat flow actuators $15_j$ does not have to match the number of $i=1, \ldots, s$ of the segments Si. In fact, typically, it will not match. Due to the heat flux field $\dot{Q}_f$ that was generated by the heat flow actuators $15_j$, there result, correspondingly, segment-heat flows $\dot{Q}_{Si}$, which means a heat flow from the test object environment into the respective segment Si or from the respective segment Si in the test object environment. FIG. 4 is a schematic depiction of this, wherein, in this embodiment, a test object component PKi has been subdivided in six segments Si.

The heat flow actuators $15_j$ generate the heat flows $\dot{Q}_j$, either to and/or from the test object component PKi. As described previously, measurement units MEi are provided at certain measurement points MSi on the test object 2 and, if need be, also in the environment of test object 2, whereby at least a temperature is measured on the test object 2. Using the measurement units MEi, it is possible to detect the measured variables MGi of the test object 2 and/or of a test object component PKi, but also the measured variables MGi of the test object environment of test object 2, such as, for example, the air pressure or the humidity in the testing space, or measured variables MGi of a heat flow actuator $15_j$, such as, for example, a flow velocity. The measured variables MGi that are detected by means of the measurement units MEi are supplied to the heat flow controller 17, which now calculates the manipulated variables for the heat flow actuators $15_j$ according to the implemented control law in order to adjust the desired segment heat flows $\dot{Q}_{Si}$ (setpoint setting). Accordingly, it is possible to adjust, in a targeted fashion, a segment heat flow $\dot{Q}_{Si}$ on the segments $S_i$ that corresponds as much as possible to the requirements, such as, for example, the real circumstances of a real test run by a physical vehicle. Naturally, the heat flow actuators $15_j$ are arranged on the test bench 1 in such a manner so as to facilitate the adjustment of the segment heat flows $\dot{Q}_{Si}$.

Thus, there has been described a flexible, open and expandable, generalized IO system (sensors and actuators, including control) for subjecting test objects 2 on the test bench 1 to heat flux fields $\dot{Q}_f$ that are variable over space and time and that provide an adequate level of quality and dynamics in correspondence to the respective test run and testing task.

According to the present teaching, a simulation unit 20 (in form of suitable simulation hardware and/or simulation software) is provided for the setpoint settings of said heat flux fields $\dot{Q}_f$ for generating the segment heat flows $\dot{Q}_{Si}$. Based on at least one suitable simulation model 22 having "real-time capability", this simulation unit 20 generates the setpoints in form of the segment heat flows $\dot{Q}_{Si}$ that are adjusted via the heat flux field $\dot{Q}_f$, which is variable over space and time.

This now allows, for example, for performing a virtual trial run (test run) where the real test object 2 is incorporated in the virtual world of an overall vehicle and simulated in the environment thereof (X-in-the-loop simulation). This means, for example, the simulation model 22 moves a virtual vehicle through a virtual world. The simulation unit 20 can also be implemented in the test bench automation unit 3. The simulation for the virtual test run on the test bench 1 is preferably in real time. I.e., a current setpoint value is calculated for each time increment, such as, for example, in the millisecond to minute range, for generating the required heat flux fields $\dot{Q}_f$ using the heat flow actuators $15_j$.

Figure 5:
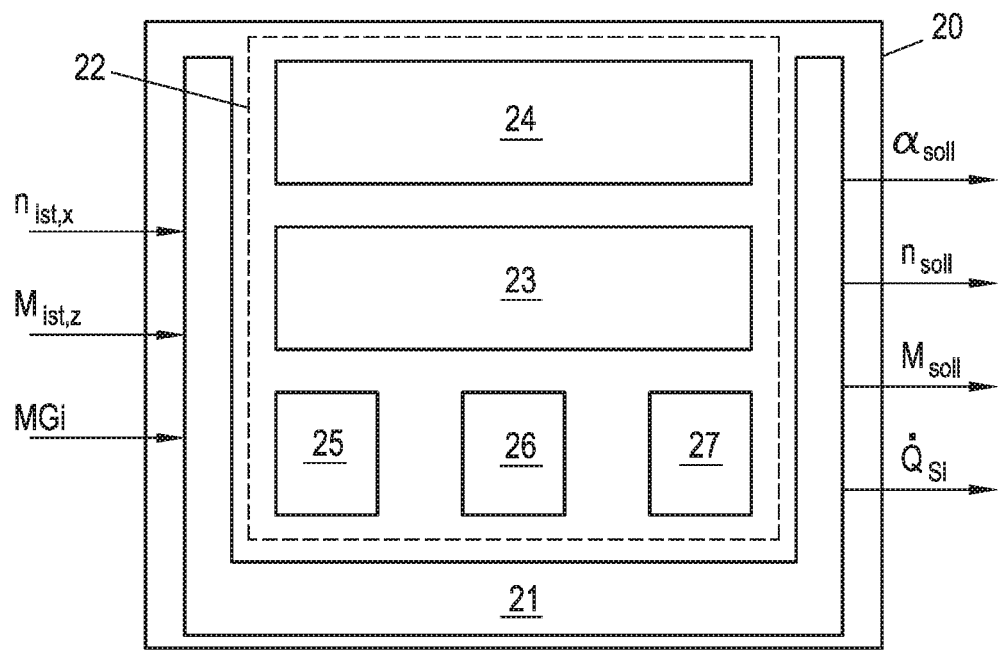
FIG. 5 shows an embodiment of a simulation unit.

The simulation model 22 comprises at least one thermal simulation model 23, as shown in FIGS. 4 and 5, that simulates how the test object 2 and/or the test object component PKi thermally would interact with the environment, if the test object 2 or the test object component PKi were incorporated in a physical vehicle and said vehicle were moved along a prescribed route. This environment of a test object component PKi consists of the vehicle components (for example, adjacent vehicle assemblies or components) that are not in reality available on the test bench and the environment of the vehicle (for example, air flow, road surface, . . . ). The thermal simulation model 23 therefore simulates particularly the thermal behavior of the vehicle components that are not physically present on the test bench 1 (if need be, also components incorporated on the test bench) and of the environment (air flow, road surface, etc., for example, in form of underhood and underbody models). This thermal interaction manifests itself in heat flows that are simulated on the test bench 1 with the aid of the heat flow actuators 15.

Additionally, it is possible to implement a vehicle model 24, a driver model 25, a road or route model 26, a wheel model 27, etc. in the simulation model 22, which has been depicted in an exemplary manner in FIG. 5. Further, it is also possible to implement an environmental model that simulates the environment of the vehicle. The different partial models of the simulation model 22 work together therein in order to execute the test run, all the while considering the thermal interaction of the test object 2 with the environment of the vehicle. With the simulation model 22, it is also possible to simulate other influences as well, such as various kinds of driver behaviors (conservative, aggressive, etc.), road conditions (for example, aquaplaning, ice, different road covers, etc.) or tires. Accordingly, it is also possible for the heat flux field $\dot{Q}_f$ to result from a simulated driving situation that accounts for particular environmental conditions. For example, it is conceivable that a sporty driver will cut a curve and thereby drive over an ice patch on the road or through a puddle (e.g., water spray), while a conservative driver, on the other hand, will follow the line of the curve and therefore avoid the ice patch or the puddle. This has a direct influence on the thermal transfer processes on the test object 2. It is even possible to provide, right on the test bench 1, real control elements for a vehicle, such as, for example, a steering wheel, a gas pedal, a brake pedal, a gear shift, etc. that can be used to actively intervene in the test run. The simulation is preferably run in real time and with the required time resolution.

Instead of diverse partial models (a vehicle model 24, a driver model 25, a road or route model 26, a wheel model 27, underhood and underbody models as part of the thermal simulation model 23, etc.), it is possible that the test run is provided in a different way, for example, in form of a conventional time-based or path-based velocity setting. The concrete test run is determined on the basis of the partial models or the time- or path-based settings, wherein the thermal interaction of the test object 2 with the environment is simulated by the thermal simulation model 23.

The simulation unit 20 further includes an interface 21 (FIG. 5) by which the simulation model 22 can be supplied with the necessary measured variables MGi but also with actual variables of the test object 2, such as an or a plurality of actual speeds $n_{ist,x}$, or of the load machine 5, such as an or a plurality of actual torques $M_{ist,z}$, and by means of which the simulation model 22 outputs calculated setpoint values for controlling the test object 2 (for example, the throttle position $\alpha_{soll}$) and/or the test bench 1 (for example, a setpoint torque $M_{soll}$ and/or a setpoint speed $n_{soll}$ of the load machine 5, or a plurality of setpoint torques and/or setpoint speeds for a plurality of load machines), and/or of the test run, particularly of the heat flow actuators $15_j$. If need be, the interface 21 provides necessary signal processing mechanisms, for example, filters for the measured variables MGi. By providing the measured variables MGi for the simulation unit 20, the "simulation loop" is closed, and the test object 2 is in fact incorporated "in the loop" of a virtual-real world.

The thermal simulation model 23, which reproduces the thermal interaction of a test object component PKi with the environment, can be designed in any way, for example, in form of a physical model, an empirical model or a trained model (neural network, linear model network, etc.). Moreover, the thermal simulation model 23 can reproduce the behavior of a test object component PKi that is present in reality on the test bench 1 and is to be examined in order to reconstruct, for example, not measured or not measurable variables (e.g., temperatures) (for example, by means of a control observer). In each preset time increment, the thermal simulation model 23 determines setpoints for the segment thermal flows $\dot{Q}_{Si}$ for at least one segment Si, preferably for each segment Si, of the test object 2. To this end, the thermal simulation model 23 processes at least one temperature that was measured by the measurement unit MEi at the associated measurement point MSi (or another equivalent physical variable). It is understood that the thermal simulation model 23 can also process further measured variables MGi, such as, for example, mass or volume flows, air pressure, ambient temperature, etc. What measured variables MGi are indeed needed will depend on the respective implementation of the thermal simulation model 23 and, if need be, from the respective implementation of the other models of the simulation model 22. It is also possible herein that the measured variables MGi that are necessary for the thermal simulation model 23 are not acquired based on a direct measurement, but that they are estimated on the basis of other measured variables MGi, for example, via a suitable observer or by calculating the same. Using the example of an exhaust gas system 11, it is possible, for example, to calculate the surface temperature at different sites on the exhaust gas system 11 based on the measurement of an input and output temperature of the exhaust gas into and out of the exhaust gas system 11 and a measurement of the exhaust gas mass flow through the exhaust gas system 11.

The thermal simulation model 23 can further process variables of the test run itself, for example, variables that are obtained from other models of the simulation model 22 or from the setpoint speed, such as, e.g., a vehicle speed. Preferably, the test run will also preset environmental conditions, such as the air temperature, humidity, etc., that can be included in the simulation model 23. But events can also be preset, for example, a thunderstorm, stoppage times of the vehicle or driving through a puddle, which can also be included in the thermal simulation model 23.

Via the interface 21, setpoints of the segment heat flows $\dot{Q}_{Si}$ that were determined, for example, numerically or model-based, are supplied to a heat flow controller 17 that adjusts these setpoints with a particular level of quality in each preset time increment of the control by means of a number of heat flow actuators $15_j$, wherein at least one heat flow actuator $15_j$ is provided, on the at least one segment Si, preferably on all segments Si. The quality therein depends, among other factors, on the concrete implementation of the heat flow actuators $15_j$. To this end, manipulated variables for the available j heat flow actuators $15_j$ are calculated based on the setpoints of the segment heat flows $\dot{Q}_{Si}$ in a heat flow controller 17, in accordance with the implemented control law, and preset for the heat flow actuators $15_i$ that generate the corresponding heat flows $\dot{Q}_j$, and/or the heat flux field $\dot{Q}_f$.

The following example is intended to illustrate the method according to the present teaching: The test object 2 is incorporated in a real vehicle and is moved across a real testing terrain in the context of a real trial run. This would result in particular real segment heat flows $\dot{Q}_{si}$ in the segments Si that are defined on the test object 2. The object now consists in generating these real segment heat flows $\dot{Q}_{Si}$, which occur during the real trial run, in a virtual trial run on the test bench 1, i.e. in a test runs, as setpoints from a suitable thermal simulation model 23. According to the laws of physics, said segment heat flows $\dot{Q}_{Si}$ significantly depend on the temperature fields that result on the test object 2, which are detected via the measurement points MSi, for example, by means of heat conduction, convection, heat radiation. To this end, the temperatures of the test object 2 are measured in every time increment on n measurement points MSi, and, based on the thermal simulation model 23, the segment heat flows $\dot{Q}_{Si}$ are calculated and adjusted at the test bench 1 by means of a heat flow controller 17 and the heat flow actuators 15j.

It must also be noted in general that there does not have to be a 1:1 correspondence between the measurement points MSi and the segments Si. For example, for individual segments, it is possible to measure the temperature multiple times, while for other segments Si, on the other hand, a temperature measurement is not required at all. On such segments, the temperature field is only estimated in these instances.

Figure 6:
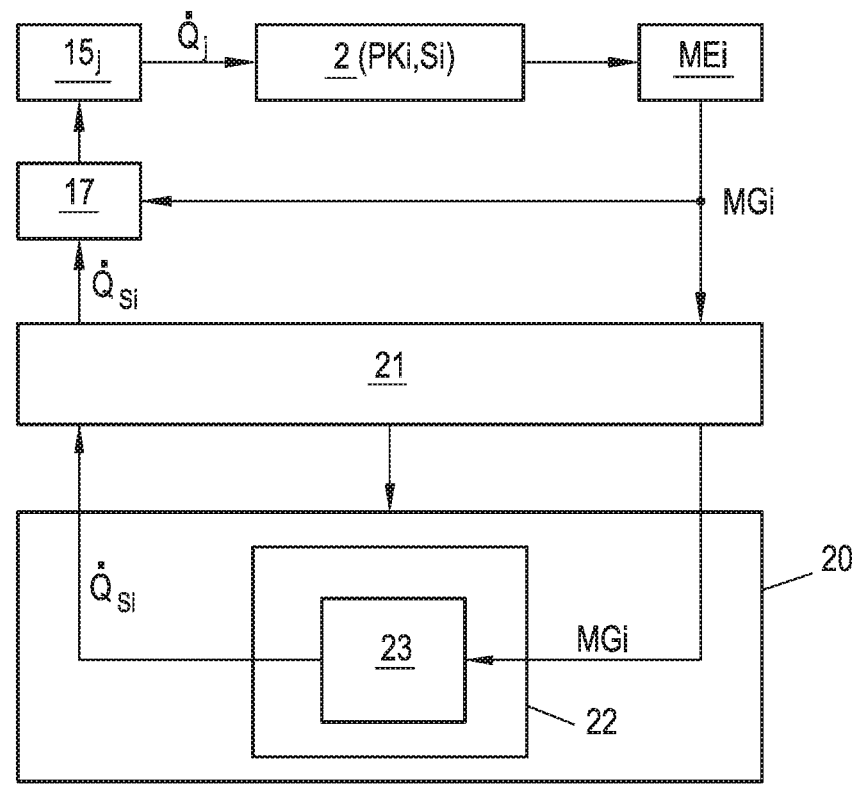
FIG. 6 shows the information flow in the implementation of the method according to the present teaching for operating a test bench.

The information flow for controlling the segment heat flows $\dot{Q}_{Si}$ is shown once more in a generalized form in FIG. 6. A number of measured variables MGi is detected at particular measurement points MSi on the test object 2 using the measurement units MEi. A temperature (or an equivalent physical variable) is detected at least at one measurement point MSi on the test object 2 therein. In addition, it is further possible to measure other measurement variables MGi, such as, for example, environmental variables (ambient temperature, humidity, air pressure, etc.), as well as mass or volume flows, as explained above. Via the interface 21, the measurement variables MGi are supplied to the thermal simulation model 23 of the simulation model 22 in the simulation unit 20, possibly also to further models of the simulation model 22. Based on the measured variables MGi, the thermal simulation model 23 determines the setpoints of the segment heat flows $\dot{Q}_{Si}$ on the segments Si. These setpoints of the segment heat flows $\dot{Q}_{Si}$ are supplied to a heat flow controller 17 for the adjustment by means of the heat flow actuators 15$_j$. The heat flow actuators 15$_j$ generate the necessary related heat flows $\dot{Q}_j$ that act upon the test object components PKi or on the segments Si that are to be conditioned.

In the case that the segment heat flows $\dot{Q}_{Si}$ change rapidly in consecutive time increments, for example when driving through a puddle, whereby, for example, an ample amount of water from the puddle evaporates on the hot muffler of the exhaust gas system 11, it can happen that the heat flow actuator 15$_j$ is unable, due to its limited dynamic properties, to adjust such quick changes of the segment heat flows $\dot{Q}_{Si}$. In such a case, it is possible to provide that at least the segment heat flows $\dot{Q}_{Si}$ are adjusted as integral mean over a suitably chosen time window, for example 1 minute, so that the integrally exchanged heat will be consistent with the test run over a longer period of time.

In order to adjust the load state of the test object 2 on the test bench 1 by means of the load machine 5 according to the test run, the simulation unit 20 can also exchange information with the test bench automation unit 3 and/or the actuator controller 4.

Although the present teaching has been described based on the example of an exhaust gas system 11, the use of other and different test object components PKi of a vehicle is obviously possible. Especially interesting is, for example, the use of a combustion engine, a radiator or a powerpack of a hybrid vehicle as a test object component PKi on which can also be provided, in each instance, a plurality of segments Si. Accordingly, an X-in-the-loop test bench 1 is realized with the present teaching, wherein for particular vehicle components (the "X") physically real hardware is incorporated in the test bench 1 (test object 2), and wherein, as a test run, a trial run is simulated, with the vehicle that has the test object 2 incorporated therein, in the simulation unit 20. It is possible to view the entire vehicle as a vehicle component. The simulation simulates the thermal interaction of the test object 2 with the environment thereof in form of thermal transfer processes, which the test object 2 would experience in the course of a real trial run. However, it is further possible to preset any other, particularly fictitious thermal transfer processes, and use the same in the course of a test run. The thermal transfer processes resulting from this simulation are adjusted at the test bench 1 by means of the heat flow actuators 15$_j$. The resulting test runs on the test bench 1 resemble reality very closely.

The invention claimed is:

1. A method for carrying out a test run on a test bench, wherein a test object in form of the vehicle or a component of the vehicle is physically set up and operated on the test bench, and a simulation unit having a simulation model simulates the test run, wherein at least one temperature is measured at a measurement point on the test object as a measured variable during the test run on the test bench, and at least one test object component of the test object is subdivided into a number of segments, that during the test run, the thermal interaction of at least one segment with the environment of the vehicle is simulated by means of a thermal simulation model of the simulation model, in that the thermal simulation model calculates the segment heat flow that is supplied to or dissipated from the at least one segment and that said segment heat flow is adjusted on the at least one segment as a function of the measured temperature by means of a number of heat flow actuators that subject the test object to a heat flow.

2. The method according to claim 1, wherein the simulation model additionally includes one or a plurality of the following models: vehicle model, driver model, road or route model, wheel model, environmental model.

3. The method according to claim 1, wherein additionally at least one further measurement variable of the test object is detected and processed in the simulation model.

4. The method according to claim 1, wherein additionally at least one further measurement variable of the test object environment of the test object is detected and processed in the simulation model.

5. A test bench for carrying out a test run, wherein a test object in form of a vehicle or a component of a vehicle is physically set up on the test bench, and wherein a simulation unit having a simulation model, simulates the test run, wherein on the test bench at least one measurement unit is provided on the test object that detects a temperature on the test bench as a measured variable, that a thermal simulation model is implemented in the simulation unit that simulates, during the test run, the thermal interaction of at least one segment of a test object component of the test object with the environment of the vehicle, in that the thermal simulation model calculates the segment heat flow that is supplied to or dissipated from the at least one segment, and that at least one heat flow actuator is provided on the test bench that subjects the test object to heat flow, and, furthermore, a heat flow controller is provided that controls the heat flow of the at least one heat flow actuator to thereby adjust the segment heat flow at the at least one segment as a function of the measured temperature.

6. The test bench according to claim 5, wherein one or a plurality of the following models are implemented in addition in the simulation model: vehicle model, driver model, road or route model, wheel model, environmental model.

7. The test bench according to claim 5, wherein at least one further measurement unit is provided on the test bench that detects a further measured variable of the test object, which is processed by the simulation model.

8. The test bench according to claim 5, wherein at least one further measurement unit is provided on the test bench that detects a further measured variable of the environment of the test object, which is processed by the simulation model.

* * * * *